Figure 1:
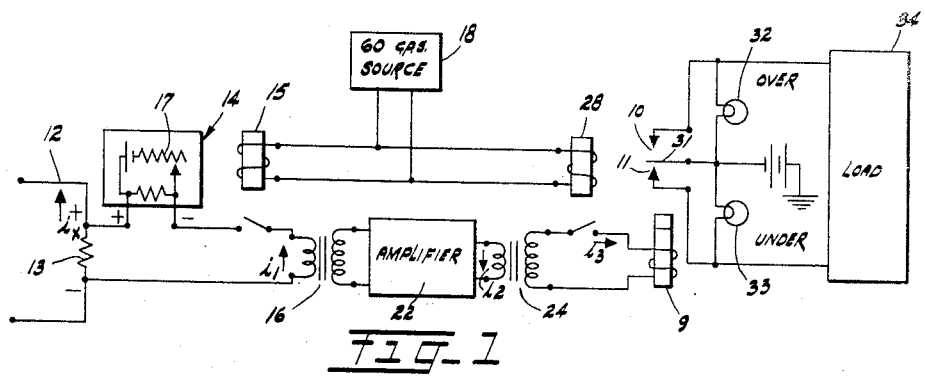
Figure 2:
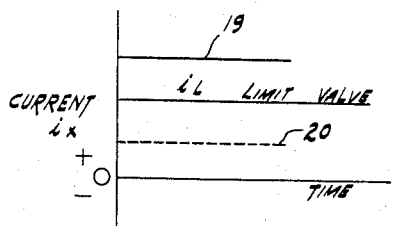
Figure 3:
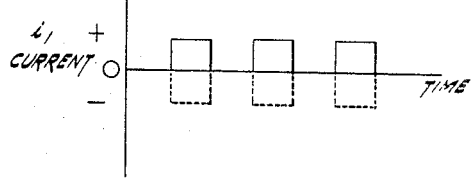

Aug. 30, 1960    J. W. McGRATH    2,951,187
ELECTRICAL INDICATING AND CONTROL APPARATUS
Filed March 11, 1957

Inventor
J. W. McGRATH
By W. C. Parnell
A. Horney

United States Patent Office 2,951,187
Patented Aug. 30, 1960

2,951,187

ELECTRICAL INDICATING AND CONTROL APPARATUS

John W. McGrath, Allentown, Pa., assignor to Western Electric Company, Incorporated, New York, N.Y., a corporation of New York Filed Mar. 11, 1957, Ser. No. 645,286

8 Claims. (Cl. 317—150)

This invention relates to electrical indicating and control apparatus and particularly to apparatus for selectively controlling an external load when the current in a circuit exceeds or falls below a prescribed control or limit value.

One method of testing the impedances of certain electrical apparatus components such as switchboard or ballast lamps is to connect them in a circuit having a source of known potential difference and observe whether or not the current in the circuit exceeds a predetermined minimum value. In adapting this limit current method for high speed automatic testing wherein it is required to operate indicators, gates or other control apparatus in accordance with the relative values of the test current, it is necessary that the loading effect of the control apparatus on the test circuit be negligible. In addition, such control apparatus must operate reliably at a high speed.

The object of this invention is a fast operating control apparatus, suitable for such automatic testing, in which an external load is selectively energized in accordance with the level of a current in a test circuit with respect to a prescribed limiting value therefor.

According to the general features of the invention, unknown direct currents in a test circuit, above or below a prescribed limit value, control the operation of a polarized switching or control device which is energized by the selective application thereto of alternate positive or negative polarity half-cycle pulses of the alternating current output of an amplifier. Specifically, a circuit feeding the input transformer of the amplifier is statically biased to produce a direct current therein of a magnitude proportional to the difference between the unknown current and the limiting value and of one polarity when the unknown current is above the value and of the opposite polarity when it is below. This circuit is periodically interrupted or opened to produce a pulsating direct current in the transformer which is converted to an alternating current and amplified, the phase of this amplified current corresponding to the polarity of the direct current pulses in the transformer. The polarized switching device is connected in the amplifier output circuit which is also periodically opened in synchronism with the input to eliminate either positive or negative polarity half-cycle pulses therefrom depending on whether or not the unknown current is in excess of the limit value.

The nature of the invention will be more fully understood from the following detailed description and by reference to the accompanying drawing, in which:

Fig. 1 is a schematic diagram of a system constructed and arranged according to a preferred embodiment of the invention, and Figs. 2 through 5 are diagrams of the currents in various parts of the system of Fig. 1.

In general, the operation of the system is such that a polarized relay 9 is operated to close one external load circuit 10 or another 11 according to whether or not a direct current "$i_x$" in a test circuit 12 is above or below a prescribed limit or control value designated "$i_L$." The circuit 12 may be a switchboard lamp test circuit in an automatic test set and the external load circuits 10 and 11 may be energizing circuits for operating gates of the test set for selectively guiding tested lamps to receptacles in accordance with the test results.

A resistance element 13 of a voltage opposition circuit is inserted in series with the test circuit 12; the resistance of this element is not critical, but it should be of such a value that the voltage drop thereover is small (i.e. 1 to 11 millivolts), as seen by the test circuit 12. The voltage opposition circuit, which is in the input circuit of an amplifier 22, includes the series arrangement of a variable direct current source 14, the contacts of a relay 15, the primary winding of a transformer 16 and the resistance element 13. The relay 15 is a fast-operating, alternating current relay energized from a sixty-cycle source 18 so that the voltage opposition circuit will be interrupted sixty times per second. The variable resistance 17 of the source 14 is adjusted to produce a voltage drop across the element 13 resulting therefrom equal to the drop thereover when the limit current "$i_L$" is in the circuit 12, the polarity of the source 14 being such that these voltage drops are in opposition. Then the current "$i_1$" in this voltage opposition circuit will be zero when the current in the test circuit 12 is equal to "$i_L$," the limiting value. When the unknown current "$i_x$" in the circuit 12 is above the control or limit value "$i_L$," as shown by the solid line curve 19 of Fig. 2, a pulsating direct current "$i_1$," as shown by the positive polarity pulses in Fig. 3, will flow in the voltage opposition circuit. Similarly, when the unknown current "$i_x$" is below the control or limit value as represented, for example, by the dashed line curve 20 of Fig. 2, the current "$i_1$" will be of opposite or negative polarity as shown by the negative pulses of Fig. 3. Then when the unknown current "$i_x$" is above the limit value, a pulsating direct current of one polarity flows through primary winding of transformer 16 and when it is below, a pulsating direct current of opposite polarity flows therein.

Figure 4:
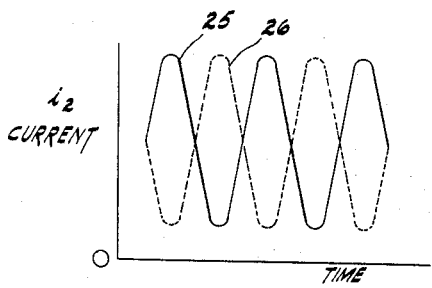
Figure 5:
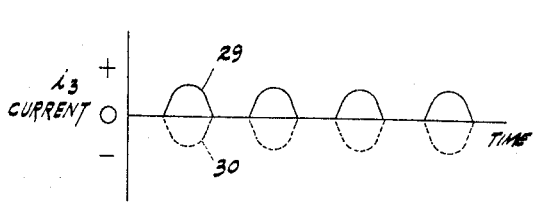

The transformer 16 feeds the input of the alternating current amplifier 22 which may be a conventional class "A" vacuum tube amplifier having a plurality of stages. The output current of the amplifier which flows in the primary winding of output transformer 24 is seen in Fig. 4, the solid line curve 25 representing the waveform of the output current for positive polarity pulses "$i_1$" in the voltage opposition circuit and the dashed line curve 26, which is 180 degrees out of phase with curve 25, represents the waveform of the output current corresponding to negative polarity pulses "$i_1$."

The secondary winding of the output transformer 24 is connected in series with the winding of the control polarized relay 9 and the contacts of alternating current relay 28 which is of the same type as relay 15. The relay 28 is connected to the source 18 and operates in synchronism with relay 15. The resulting current in the polarized relay 9 is a pulsating direct current of either positive or negative polarity, as seen by curves 29 and 30, respectively, depending on the polarity of the input pulses to the amplifier. The amplifier 22 together with the input and output transformers 16 and 24, respectively, and the synchronized interrupting relay 28 actually constitute an effective yet reliable means for amplifying the pulsating "$i_1$" in the voltage opposition circuit. Then, whenever the current "$i_x$" is above the limiting value, the resulting positive polarity pulsating direct current 29 will cause relay 9 to move its armature 31 to close the external circuit 10 without ambiguity and whenever current "$i_x$" is below the limiting value, the negative polarity pulsating direct current 30 will cause the armature 31 to move to close circuit 11. In addition, to operate other control devices such as the aforementioned gates which are shown generally by the block 34 labeled "load," lamps 32 and 33 are connected between the armature 31 and the circuits 10 and 11, respectively, to indicate whether the value of "$i_x$" is over or under the limiting value.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an electrical control apparatus responsive to the magnitude of an unknown current in an electrical circuit, a polarized switching device for controlling the operation of an external load, and an energizing circuit for the switching device, said energizing circuit including means for producing an alternating current in the energizing circuit, means for reversing the phase of the alternating current when the unknown current in said electrical circuit exceeds a prescribed limiting value and means for periodically opening the energizing circuit to eliminate all half-cycles of the alternating current of one polarity when the unknown current is above the limiting value and to eliminate all of the half-cycles thereof of the opposite polarity when the unknown current is below said value so that the remaining polarized portions of the alternating current selectively operate the switching device in accordance with the level of the unknown current as compared to the limiting value.

2. Electrical switching apparatus responsive to an unknown direct current in an electrical circuit comprising input and output circuits, a polarized switching device connected in the output circuit, means in the input circuit responsive to the unknown current for producing a direct current of one polarity when the unknown current is above a prescribed value and of the opposite polarity when it is below, means for periodically interrupting the direct current in the input circuit, means responsive to the interrupted direct current in the input circuit for producing an alternating current in the output circuit, and means synchronized with the interrupting means for periodically interrupting the alternating current in the output circuit to eliminate positive or negative polarity half cycles therefrom in accordance with the polarity of the current in the input circuit to selectively operate the polarized device.

3. Electrical switching apparatus responsive to an unknown direct current in a test circuit, comprising input and output circuits, a polarized switching device connected in the output circuit, means in the input circuit for deriving a potential difference proportional to the unknown current, means in the input circuit controlled by the derived potential difference for producing a direct current of one polarity when the unknown current is above a prescribed value and of the opposite polarity when it is below, means for periodically interrupting the direct current in the input circuit, means including an amplifier responsive to the interrupted direct current in the input circuit for producing an alternating current in the output circuit, and means synchronized with the interrupting means for periodically interrupting the alternating current in the output circuit to eliminate positive or negative polarity half-cycles therefrom depending on the polarity of the current in the input circuit to selectively operate the polarized device.

4. Electrical switching apparatus responsive to an unknown direct current in an electrical circuit comprising input and output circuits, a polarized switching device connected in the output circuit, means in the input circuit for producing a direct current proportional to the difference between the unknown current and a prescribed value therefor, the current being of one polarity when the unknown current is above the prescribed value and of the opposite polarity when below, means for periodically interrupting the direct current in the input circuit, means including an amplifier responsive to the interrupted direct current in the input circuit for producing an alternating current in the output circuit, and means synchronized with the interrupting means for periodically interrupting the current in the output circuit to eliminate positive or negative polarity half-cycles therefrom in accordance with the polarity of the current in the input circuit to selectively operate the polarized device.

5. A system for controlling a polarized switching device to close a set of contacts when an unknown direct current in a circuit exceeds a prescribed value comprising an input circuit responsive to the unknown current having means for producing a direct current of one polarity when the unknown current is above a prescribed value and of the opposite polarity when it is below, means for periodically opening the input circuit to convert the current therein to a pulsating one, an output circuit, a polarized switching device connected in the output circuit, means responsive to the pulsating current in the input circuit for producing an alternating current in the output circuit, and means for periodically opening the output circuit in synchronism with the opening of the input circuit to eliminate the half-cycle of one polarity therefrom leaving only current of the required polarity to operate the switching device to close the contacts when the unknown current is above the prescribed value.

6. A system for controlling a polarized relay to operate a first set of contacts when an unknown direct current in a circuit is above a prescribed value and a second set of contacts when the current is below said value comprising means including an amplifier for converting pulsating direct currents into alternating currents, an input circuit for the converting means, means in the input circuit for deriving a potential difference proportional to the unknown current, means in the input circuit controlled by the derived potential difference for producing a direct current of one polarity when the unknown current is above a prescribed value and of the opposite polarity when it is below, means for periodically opening the input circuit to convert the current therein to a pulsating one, and an output circuit for the converting means including the polarized relay and means for periodically opening the output circuit in synchronism with the opening of the input circuit to eliminate the half-cycle pulses of one polarity leaving the pulses of only the required polarity to operate the relay to close the first set of contacts when the unknown current is above the prescribed value and to eliminate the half-cycle pulses of the opposite polarity leaving pulses of only the polarity required to operate the relay to close the second set of contacts when the unknown current is below the prescribed value.

7. Electrical switching apparatus responsive to an unknown direct current comprising means for deriving a potential varying with the current, a source of balancing potential, an amplifier, input and output transformers for the amplifier, means including a first interrupting device for applying to the input transformer pulses of a magnitude corresponding to the difference between the varying and the balancing potentials and of a polarity corresponding to the relative magnitudes of the potentials, two load circuits, means connected to the output transformer for selectively energizing the circuits according to the polarity of pulses applied thereto, and a second interrupting device operating synchronously with the first and having contacts in the connections between the energizing means and the output transformer for determining the polarity of the applied pulses.

8. Electrical switching apparatus responsive to an unknown direct current comprising means for deriving a potential varying with the current, a source of balancing potential, means including a first interrupting device for deriving a periodic pulsating current, the pulses having a magnitude corresponding to the difference between the varying and the balancing potentials and of a polarity corresponding to the relative magnitudes of the potentials, means including an amplifier and an interrupting device synchronized with the first interrupter for amplifying the pulses, a polarized switching device, and means for energizing the switching device with the amplified pulsating current.

References Cited in the file of this patent

UNITED STATES PATENTS

| | | |
|---|---|---|
| 2,366,618 | Harrison | Jan. 2, 1945 |
| 2,459,730 | Williams | Jan. 18, 1949 |
| 2,486,641 | Gilbert | Nov. 1, 1949 |
| 2,622,192 | Tarpley | Dec. 16, 1952 |
| 2,636,094 | Russell | Apr. 21, 1953 |